UNITED STATES PATENT OFFICE.

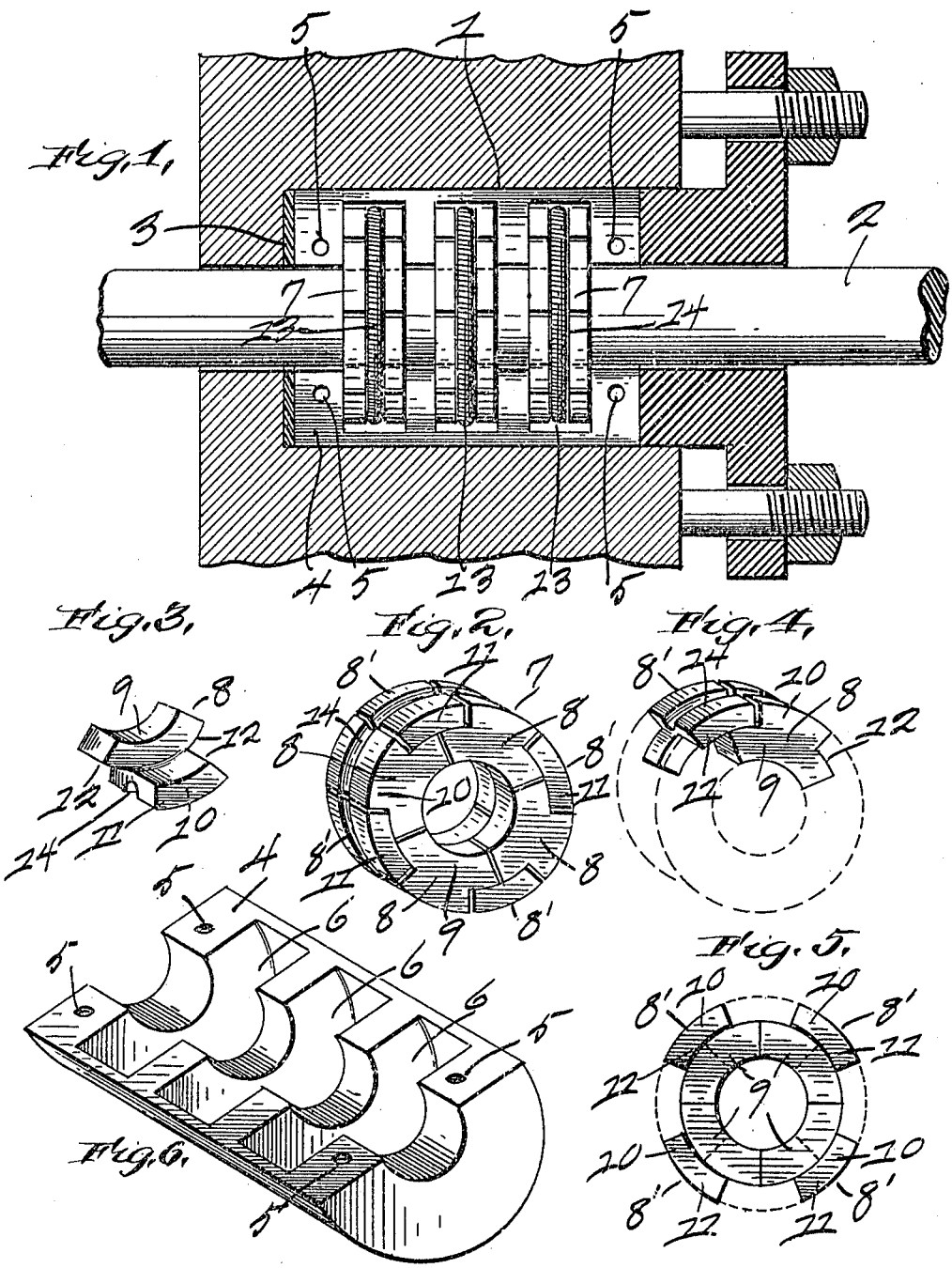

EUGENE PASSONO, OF TOLEDO, OHIO, ASSIGNOR TO THE PASSONO METALLIC PACKING COMPANY, OF TOLEDO, OHIO, A COPARTNERSHIP.

METALLIC PACKING.

954,203.  Specification of Letters Patent.  Patented Apr. 5, 1910.

Application filed February 17, 1909. Serial No. 478,444.

*To all whom it may concern:*

Be it known that I, EUGENE PASSONO, citizen of the United States, residing at Toledo, in the county of Lucas and State of Ohio, have invented certain new and useful Improvements in Metallic Packing; and I do hereby declare the following to be a full, clear, and exact description of the invention, such as will enable others skilled in the art to which it appertains to make and use the same.

This invention relates to improvements in metallic packing for piston rods of steam engines, ammonia engines, etc., and it contemplates certain improvements in the form and relative arrangement of the segments of a sectional metallic packing ring by which the same is rendered nearly if not completely leakage-proof.

The invention embodies the novel combination, arrangement and details of construction hereinafter shown, described and specifically claimed.

In the accompanying drawings Figure 1 is a horizontal section of a stuffing box with my improved metallic packing rings in position upon a piston rod, the upper half section of the cage which supports the rings being removed; Fig. 2 is a perspective view of a packing ring assembled; Fig. 3 is a perspective of a single segment; Fig. 4 is a like view of two segments; Fig. 5 is an elevation of four segments forming one face of the ring, the position which the other segments of the ring would assume being shown in dotted outline; Fig. 6 is a perspective of one of the cage sections.

Referring to the details, 1 is an ordinary stuffing box and 2 a piston rod. Located so as to fit snugly within the stuffing box and having a soft packing seat 3 at one end, is a cast cylindrical cage made in two half sections, as at 4, adapted to be secured together by screws passing through one section and entering threaded perforations 5 in the other section. The two half sections of the cage when assembled are provided with cylindrical pockets 6, 6, 6 for the segmental metallic packing rings 7 which fit snugly in the pockets to prevent endwise play as the piston moves backward and forward and to break the peripheral joints of the ring. Each ring 7 comprises a plurality of interengaging segments or sections 8 and 8', the segments 8 being identical in form and proportion to the segments 8', the former constituting one face and the latter the other of the ring. In the example illustrated each ring consists of eight segments and each segment has an inner portion 9 in sliding contact with the piston, which is twice the angular dimension of the outer portion 10, that is, where there are eight segments the inner portion of each segment measured radially from the central axis of the ring when assembled, is ninety degrees, and the outer portion will be forty-five degrees. The outer portion of each segment is also extended laterally on one side at 11 so as to overlie the shoulders 12 of the inner portions of the adjacent segments. With the form of segment described and in the example illustrated, the inner portion of the segments 8 will alternate with those of the segments 8' as will also the joints between them. It will be observed that as the outer portion of the segments 8 alternate with those of the segments 8' any tendency of the segments to become disarranged will be eliminated. To maintain the segments in assembled relation prior to being placed in position in the two-part cage and also to insure contact of the inner faces of the segments with the piston on which the ring is mounted, there is provided an annular coiled spring 13 which occupies a groove 14 each segment being grooved to form a continuous groove about the outer face of the ring.

What I claim, is—

1. In a metallic packing, a ring consisting of a plurality of alternately arranged segments the inner portions of which are substantially twice the angular dimension of the outer portions, said segments being substantially identical in shape, substantially as described.

2. In a metallic packing, a ring consisting of a plurality of segments the inner portions of which are substantially twice the angular dimension of the outer portions, and lateral extensions upon the outer portion of each segment adapted to overlie the inner portions of the adjacent segments, substantially as described.

3. In a metallic packing, a ring consisting of a plurality of segments the inner portions of which are substantially twice the angular dimension of the outer portions, the outer portions of the segments alternately extending in opposite directions to overlie the inner portions of adjacent segments, and resilient means for holding the segments in assembled relation.

4. In a metallic packing, a ring consisting of a plurality of alternately arranged segments, the inner portions of which are substantially twice the angular dimension of the outer portions, the outer portions being disposed intermediate the peripheral arcs of the inner portions.

5. In a metallic packing, a ring consisting of a plurality of alternately arranged segments the inner portions of which are substantially twice the angular dimension of the outer portions, the said ring being fitted into a pocket, for the purposes specified.

In testimony whereof, I hereunto affix my signature, in presence of two witnesses.

EUGENE PASSONO.

Witnesses:
CARL H. KELLER,
GEO. D. PALMER.